United States Patent
Klein et al.

(10) Patent No.: US 12,233,740 B2
(45) Date of Patent: Feb. 25, 2025

(54) MACHINE LEARNING FOR OPTIMIZATION OF POWER DISTRIBUTION TO ELECTRIC VEHICLE CHARGING PORTS

(71) Applicant: Volta Charging, LLC, San Francisco, CA (US)

(72) Inventors: David J. Klein, Los Altos, CA (US); Andrew Forrest, San Francisco, CA (US); Praveen K. Mandal, San Francisco, CA (US)

(73) Assignee: Volta Charging, LLC, San Francisco, CA (US)

(*) Notice: Subject to any disclaimer, the term of this patent is extended or adjusted under 35 U.S.C. 154(b) by 353 days.

(21) Appl. No.: 17/840,528

(22) Filed: Jun. 14, 2022

(65) Prior Publication Data

US 2022/0396172 A1    Dec. 15, 2022

Related U.S. Application Data

(60) Provisional application No. 63/210,455, filed on Jun. 14, 2021.

(51) Int. Cl.
*B60L 53/68* (2019.01)
*B60L 53/64* (2019.01)
(Continued)

(52) U.S. Cl.
CPC ............ *B60L 53/68* (2019.02); *B60L 53/64* (2019.02); *B60L 53/66* (2019.02); *G05B 13/0265* (2013.01)

(58) Field of Classification Search
None
See application file for complete search history.

(56) References Cited

U.S. PATENT DOCUMENTS

| 2012/0245750 A1 | 9/2012 | Paul et al. |
| 2014/0028254 A1 | 1/2014 | Shane et al. |

(Continued)

FOREIGN PATENT DOCUMENTS

WO    WO 2021/069597 A1    4/2021

OTHER PUBLICATIONS

International Searching Authority, Search Report, in European Patent Application No. PCT/US2022/033495, dated Oct. 4, 2022, 13 pages.

(Continued)

*Primary Examiner* — Sean Shechtman
(74) *Attorney, Agent, or Firm* — Hickman Becker Bingham Ledesma LLP (57) ABSTRACT

An approach is provided for dynamically controlling power distribution amongst a plurality of charging station ports based on one or more objectives. A method includes obtaining input data, wherein the input data includes at least one of: user data associated with one or more current charging station users, or non-user data that is not associated with the current charging station users. The method includes processing the input data through one or more machine learning engines, wherein the one or more machine learning engines are trained to determine a particular power distribution, among the plurality of charging station ports, that achieves one or more objectives. The method includes configuring the plurality of charging station ports according to the particular power distribution. The particular power distribution specifies a maximum charging rate or a percentage of a power budget for each of the plurality of charging station ports.

23 Claims, 5 Drawing Sheets

402
OBTAIN INPUT DATA, WHEREIN THE INPUT DATA INCLUDES AT LEAST ONE OF: USER DATA ASSOCIATED WITH ONE OR MORE CURRENT CHARGING STATION USERS, OR NON-USER DATA THAT IS NOT ASSOCIATED WITH THE ONE OR MORE CURRENT CHARGING STATION USERS

404
PROCESS THE INPUT DATA THROUGH ONE OR MORE MACHINE LEARNING ENGINES, WHEREIN THE ONE OR MORE MACHINE LEARNING ENGINES ARE TRAINED DETERMINE A PARTICULAR POWER DISTRIBUTION, AMONG THE PLURALITY OF CHARGING STATION PORTS, THAT ACHEIVES ONE OR MORE OBJECTIVES

406
CONFIGURE THE PLURALITY OF CHARGING STATION PORTS ACCORDING TO THE PARTICULAR POWER DISTRIBUTION (51) Int. Cl.
*B60L 53/66* (2019.01)
*G05B 13/02* (2006.01)

(56) References Cited

U.S. PATENT DOCUMENTS

2019/0202304 A1 7/2019 Moghe et al.
2020/0082352 A1 3/2020 Liu et al.

OTHER PUBLICATIONS

Current Claims, in European Patent Application No. PCT/US2022/033495, dated Oct. 4, 2022, 7 pages.

= MULTI-PORT CHARGING STATION

402
OBTAIN INPUT DATA, WHEREIN THE INPUT DATA INCLUDES AT LEAST ONE OF: USER DATA ASSOCIATED WITH ONE OR MORE CURRENT CHARGING STATION USERS, OR NON-USER DATA THAT IS NOT ASSOCIATED WITH THE ONE OR MORE CURRENT CHARGING STATION USERS

---

404
PROCESS THE INPUT DATA THROUGH ONE OR MORE MACHINE LEARNING ENGINES, WHEREIN THE ONE OR MORE MACHINE LEARNING ENGINES ARE TRAINED DETERMINE A PARTICULAR POWER DISTRIBUTION, AMONG THE PLURALITY OF CHARGING STATION PORTS, THAT ACHEIVES ONE OR MORE OBJECTIVES

---

406
CONFIGURE THE PLURALITY OF CHARGING STATION PORTS ACCORDING TO THE PARTICULAR POWER DISTRIBUTION

FIG. 5

MACHINE LEARNING FOR OPTIMIZATION OF POWER DISTRIBUTION TO ELECTRIC VEHICLE CHARGING PORTS

BENEFIT CLAIM

This application claims the benefit of provisional application 63/210,455, filed Jun. 14, 2021, by David J. Klein et al., the entire contents of which is hereby incorporated by reference as if fully set forth herein, under 35 U.S.C. § 119(e).

FIELD OF THE INVENTION

The present invention relates to power distribution and, more specifically, to machine learning techniques for optimizing dynamic power distribution in the charging of electric vehicles in multi-port charging scenarios.

BACKGROUND

As the adoption electric vehicles increases, so does the need to efficiently control the distribution of power to the charging stations that they use. Unfortunately, the optimal distribution of power is not always evident in situations where multiple vehicles are simultaneously charging at a power station that has multiple ports. Typically, such power stations have a fixed maximum charging power (e.g. 50 Watts) that must be divided among the charging ports being used.

In a simple scenario that involves a charging station with two ports, one solution would be to adopt a fixed, even distribution of the power between the ports, resulting in 25 Watts each. However, that solution is not necessarily optimal. For example, referring to FIG. 1, a first vehicle 112 being charged at one of the ports (port 102) of a charging station 100 may be able to stay connected for a long duration (e.g. while the owner eats at a nearby restaurant), while a second vehicle 114 being charged at the other of the ports (port 104) may only have a short connection time (e.g. a short pitstop on a long trip). In this case, distributing power evenly between the ports may produce the non-optimal results of failing to sufficiently charge the second vehicle 114, while fully charging the first vehicle 112 long before the owner needs to be on her way.

Figure 2:
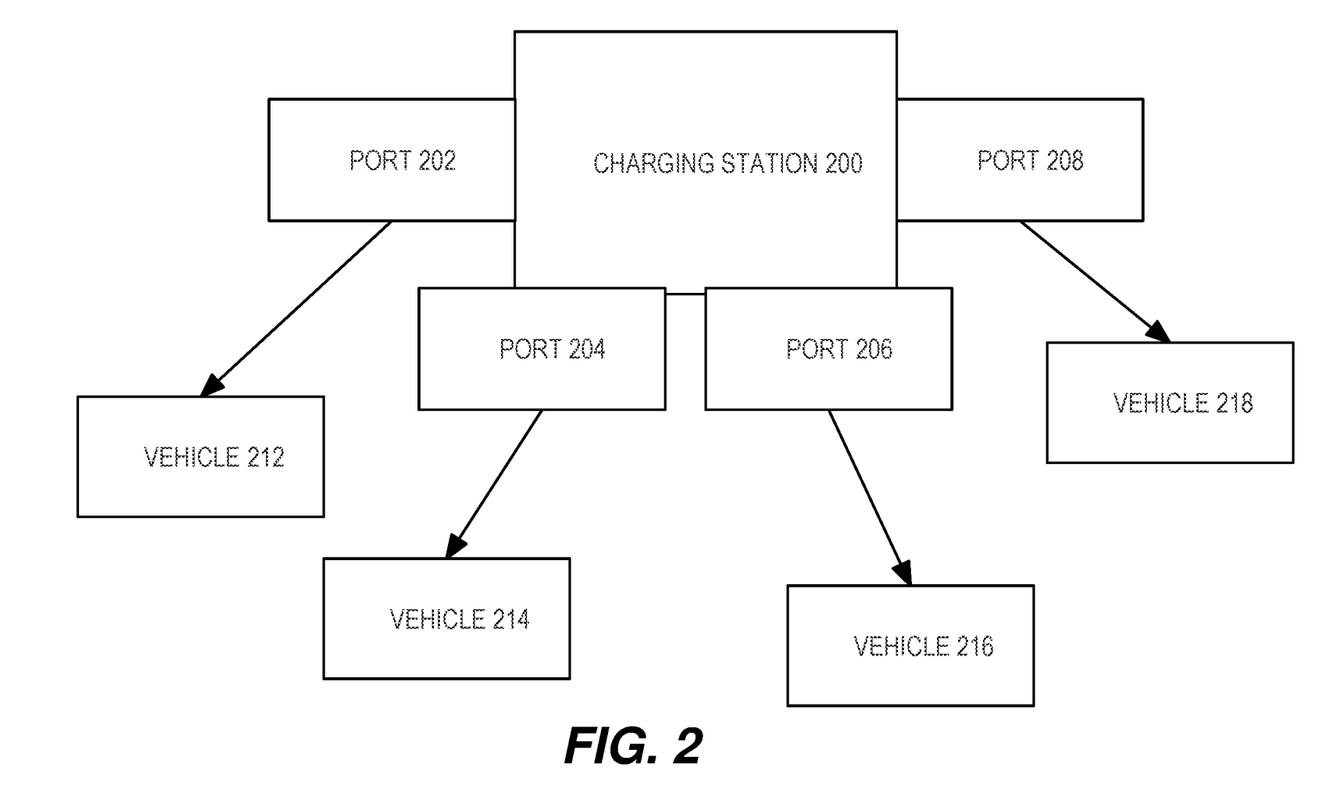
FIG. 2 is a block diagram of a 4-port charging station.

The difficulty of determining the optimum distribution of power in a multi-port system increases as the complexity of the power distribution system increases. For example, it may be desirable to optimize power distribution across a large number of charging ports (see FIG. 2), all of which are connected to a single charging station that has a fixed maximum charge capacity (e.g. 200 Watts). Further, it may be desirable to control power distribution at multiple ports based on an entire network of charging stations that are spread across a site, large geographic region (See FIG. 3), or the entire country.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

DETAILED DESCRIPTION

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.
  I. General Overview
  II. Features for Determining Power Distribution
  III. Obtaining Data for Automated Power Distribution Systems
  IV. Controlling Power Distribution Based on System-Wide Considerations
    A. Optimizing for Multiple Objectives
  V. Implementation Processes
  VI. Hardware Overview I. General Overview Techniques are described herein for dynamically controlling power distribution in a multi-port charging station based on one or more objectives. The system dynamically allocates a fixed power budget (determined by the capabilities of the charging station) among the multiple ports of the multi-port charging station. In addition, techniques are described for optimizing distribution of power across a distributed network of charging stations. The techniques may be used, for example, in conjunction with power stations in which each port has a corresponding independently-controlled transformer for converting AC power to DC used to charge the electric vehicle connected to the port.

According to one embodiment, the power distribution control signals that dynamically control the allocation of power among the ports of multi-port charging stations are generated based on the output of one or more machine learning engines that have been trained to optimize power distribution to achieve one or more objectives. The one or more objectives may include, but are not limited to:
  maximizing the number of vehicles serviced
  maximizing the number of "essential" vehicles that are fully charged
  maximizing the total amount of power distributed
  minimizing the average charge time
  maximizing the revenue of the charging service
  maximizing use of off-peak charging (minimizing cost of energy)
  providing preferential treatment to a certain class of users
  ensuring vehicles are charged sufficiently to reach the next charging station in their current route These are merely examples of parameters for which the power distribution control may be optimized. The techniques described herein are not limited to any particular objectives or combination of objectives.

The machine learning engine may be trained to make power distribution decisions based on information obtained from a variety of sources. Such sources may include, for example, information obtained directly from the user of a charging station. Such directly-obtained information may be obtained through input controls (e.g. a keypad) at the charging station itself, or through a mobile application capable of providing information to the computer systems that are executing the machine learning engine. Instead of or in addition to such directly-obtained information, the information used by the machine learning engine to make power distribution decisions may be obtained indirectly, such as through one or more sensors in the vicinity of the charging stations, or from third-party services that collect the relevant information. The information upon which the machine learning system bases power distribution decisions, and the means for obtaining such information, shall be described hereafter in greater detail.

II. Features for Determining Power Distribution

To make power distribution decisions to optimize for one or more objectives, a machine learning engine must (a) be trained based on data that corresponds to a set of features, and (a) obtain real-time data, corresponding to those features, about the current users of the charging stations that are being controlled. According to one embodiment, the features used to train the machine learning engine to make power distribution decisions include one or more of:

- a category of user (e.g. essential or opportunistic, gold account holder, etc.)
- a charge duration (how long the user expects to be charging)
- current state of the vehicle's battery (e.g. empty vs almost full)
- information regarding user's current trip (e.g. distance remaining, availability of other charging stations, etc.)
- type of vehicle
- charging "ramp up" time
- current time of day
- current cost of energy (highest during peak hours)
- energy source for charging (e.g., on-site battery versus AC wall power)
- utility considerations (e.g. load balancing over a power grid)
- charger capacity for individual or aggregate charging stations at a single location or for a geographic area With respect to category of user, users may be categorized in a variety of ways, and the categories to which a user belongs may affect the rate at which power is distributed to the port to which the user's vehicle is connected. For example, users who are charging during a pitstop on a long trip may be treated differently than users who are charging as part of their daily commute routine.

In addition, different users may have different types of accounts with the charging service. For example, a user may pay more to qualify as a "gold" member, where gold members receive preferential treatment relative to members that do not have gold accounts. Thus, a gold member may receive a 10% faster charge than the gold member would otherwise receive. In situations where the vehicle of the gold member is connected to a port of a multi-port charging station, those non-gold members connected to the other ports of the charging station would receive fractionally slower charging.

With respect to charge duration, the power directed to a port may be based on how long the vehicle at the port is expected to be charging. For example, assume that a charging station has two ports, and the vehicles attached to the two ports have the same charge state. If it is known that one user will be charging for two hours while the other has only ten minutes, the machine learning engine may be trained to direct a much higher ratio of the power available to the port connected to the vehicle that will be leaving in ten minutes. In that scenario, the vehicle with less available charging time may be fully charged without negatively affecting the charging of the other vehicle (which will also be fully charged by the time the vehicle is needed).

With respect to the current state of a vehicle's battery, the machine learning engine may be trained to increase the amount of power directed to ports that are charging batteries whose current charge is below a certain threshold. For example, in a charging station that is a long distance from any other charging station, the machine learning engine may be trained to allocate an higher amount of power to ports that are connected to batteries that have insufficient charge to enable the vehicle to make it to the next available charging station. Once a battery's charge has reached the threshold, the amount of power directed to the port may be reduced to no longer give that port preferential treatment.

Information regarding a user's current trip may be particularly helpful in making power distribution decisions. For example, if it is known that a user is only a few miles from work, and that charging stations are available at the work location, then the amount of power distributed to the port to which the user's vehicle is connected may be relatively higher while the charge state is below what is necessary for the user to travel to the work location, and then reduced once the charge state is sufficient for the user to travel to the work location.

As another example, a charging station may be located at the outskirts of a large city. If it is known that the user is travelling into the city, it is less important to fully charge the user's vehicle because other charging stations may be readily available in the direction the user is heading. On the other hand, a user heading out of the city may be travelling on a freeway where the next available charging station is hundreds of miles away. Based on the latter user's need to travel a long distance before charging, the machine learning engine may be trained to direct more power to the user's port to increase the likelihood that the user will be sufficiently charged to make it to the next charging station on the user's route.

The type of vehicle that is being charged at a particular port may also play a large factor in the power distribution decision made by the machine learning engine. For example, emergency vehicles (e.g. police cars, fire engines) may receive preferential treatment, having more of the available power directed to the port to which they are connection than would be otherwise be directed to a non-emergency vehicle.

In addition, the type of vehicle may be used in conjunction with the other input features. For example, not all electric vehicles get the same mileage. Thus, the type of vehicle and the current charge level must both be taken into account to determine how much charging is necessary for the vehicle to make it to the next charging station location. As another example, the type of vehicle may be in indicator of the "ramp-up" time required to charge the vehicle, where different vehicles experience different ramp-up times for charging.

The type of vehicle may also put constraints on the power allocation. For example, a certain type of vehicle may only support being charged at a certain rate. In such a situation, it would be undesirable to distribute to the port to which such a vehicle is connected an amount of power that is greater than the vehicle's charge rate capacity.

With respect to time of day and cost of energy, it is generally preferred to perform less charging less during peak hours, when the cost of energy is at it highest. Based on information about the current time of day, the cost of energy, and the expected charging duration of a vehicle, the machine learning engine may determine that a vehicle will be connected to a charging port for a period that includes both peak time and non-peak time. In such a situation, the machine learning engine may reduce the power allocated to the port at which the vehicle is charging during the peak time, and then dynamically increase the power to the same port during non-peak time.

III. Obtaining Data for Automated Power Distribution Systems

A feature cannot be used in the power distribution decision made by the machine learning engine unless data for the feature is obtained, which may be obtained (a) to train the machine learning engine, and (b) in real-time from the users of the multi-port charging stations. Various means may be used to obtain such data. How data for a feature is obtained may vary from implementation to implementation, and may hinge on the nature of the feature.

As one example, a user input device may be located on or near each charging station. A user may use the input device to enter information such as the amount of time the user intends to be charging at the station, the type of vehicle the user has, etc.

If the charging station is equipped with a credit card reader, the system may use the owner identification obtained from the user's credit card to look-up a stored user's profile. The user's profile may contain information such as whether the user is a "gold" member, the type of vehicle owned by the user, etc. The user's profile may also include information regarding the home location of the user. The system may compare the home location of the user to the location of the charging station in question to determine whether the user is near home or away from home. The "home" or "away" determination may influence the power distribution to the port to which the user's vehicle is connected (e.g. "away" users may receive faster charges under the assumption that that are on longer journeys).

The system to which the machine learning engine is connected may also have APIs that support communications with mobile applications. When such is the case, the machine learning engine may receive information about a user's current trip directly from a mobile application, such as a GPS navigation application that has information about the user's current trip. The machine learning mechanism may then base power routing decisions on factors such as how far the user is travelling and the availability of other charging stations along the route the user is going.

The system may have its own native mobile application, where users store profile information such as the home location of the user, the type of electric vehicle owned by the user, whether the user is a "gold" member, etc. The user conveys the user's identification to the charging station in a variety of ways, such as sending a wireless signal from the mobile device that is executing the mobile application, by having a bar code or QR code displayed by the mobile application read by a device at the station, by entering a userid into a user input device at the station, etc. Once the system has identified the user, the system may then access the profile information that the user has provided to the mobile application.

Information may also be obtained by sensors on or near the charging station. For example, the charging station may include a camera that captures an image or video of a vehicle located at a charging station. Based on the image or video, the system may determine the make and model of the vehicle being charged. The image may also include the owner of the vehicle. Using facial recognition, the system may determine the identity of the owner based on the image or video, and use the identity information to look up additional information about the owner in a stored profile.

The electric vehicle itself may be equipped for a mechanism for communicating the type of vehicle and/or the identify of the owner. For example, an electric vehicle may include an RFID chip or circuit that identifies the vehicle and/or the owner. In addition to user the owner's identity to obtain addition information from the user's profile, the system may keep track of the vehicle's identity, the location of charging, the time of charging, the duration of charging and the state of the vehicle's battery both before and after the charge. Based on this information, the system may determine the mileage of the vehicle, and the vehicles travel history. This derived information may be used as input features to the machine learning engine.

Some of the data used by the machine learning engine that controls the allocation of energy between the various ports of a charging station may itself come from other machine learning engines. For example, a machine learning engine may be trained to predict the duration that electric vehicles will be at charge stations. The prediction may be based on things such as the type of electric vehicle, the state of the vehicle's battery, etc. The duration prediction generated by the machine learning engine may then be fed as the "duration" input to the machine learning engine that controls the allocation of energy between the ports of the charging station.

IV. Controlling Power Distribution Based on System-Wide Considerations

Figure 3:
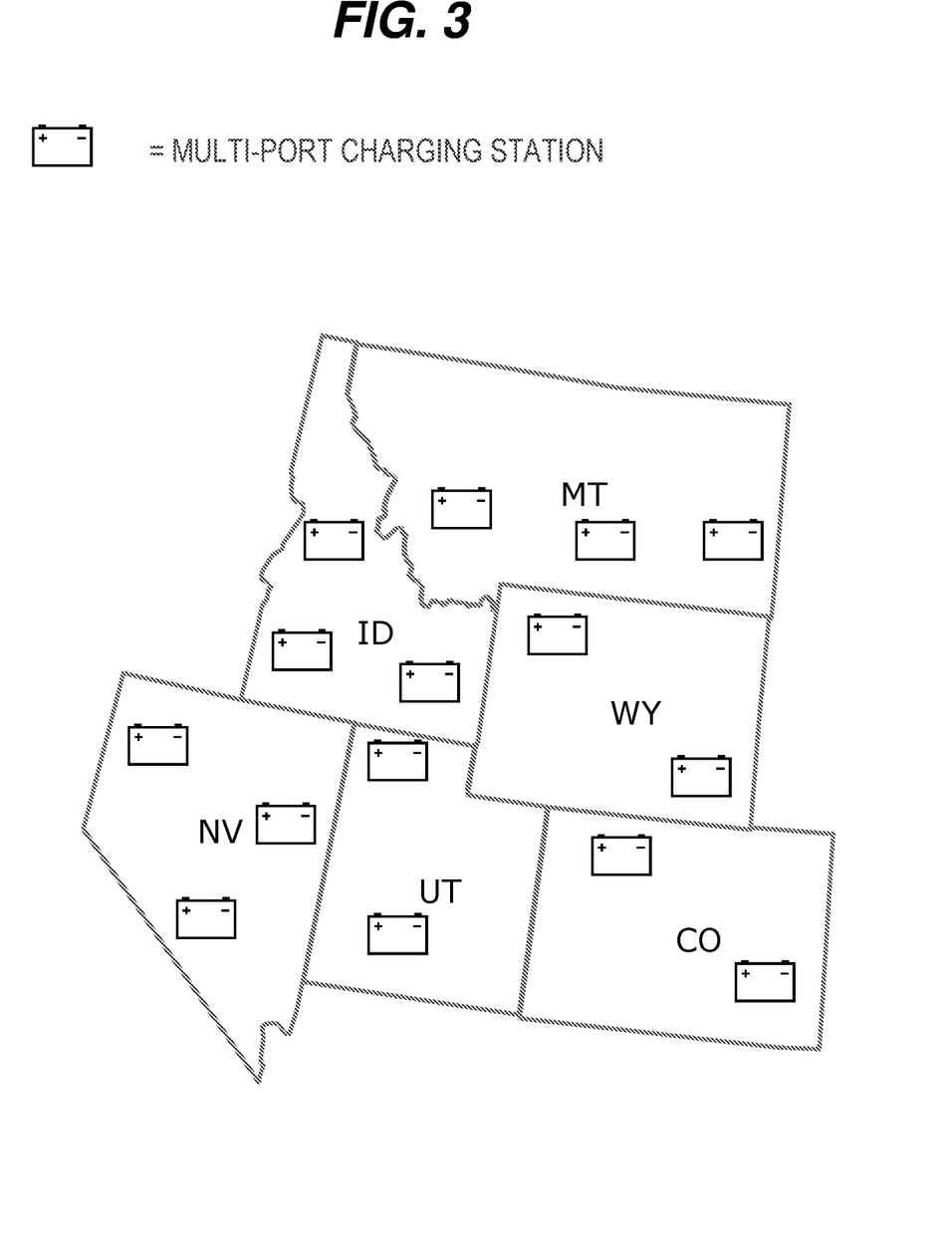
FIG. 3 is a block diagram illustrating multi-port charging stations spread across a multi-state region.

The objectives used by the machine learning engine to control power distribution may involve system-wide objectives. For example, as illustrated in FIG. 3, numerous multi-port charging stations may be spread across a large geographic region. In such a system, objectives may involve the system as a whole, rather than optimizing use of individual multi-port charging stations. For example, a system-wide objective might be to evenly distribute charging across the charging stations that belong to the system. In such a system, all else being equal, the same vehicle may be allocated more power when charging at a less-used charging station then when charging at a more popular charging station.

As another example, in a system where vehicle travelling routes are known, the system may allocate relatively more power to ports of vehicles that are on routes that do not include many charging stations, and relatively less power to port of vehicles that are on routes where charging stations are conveniently available. Similarly, if it is known that a driver is nearly home, and that a charging station exists at the user's home, then a relatively smaller amount of power may be allocated to the port at which the user's vehicle is connected.

To support optimization of system-wide objectives, additional features may need to be used to train the machine learning engine. Such addition features may include, for example:

information about all available chargers
    information about all electric vehicle traffic
    locations where charging power is at least partially from solar panels
    locations where charging power is at least partially from local battery storage
    the type of charging mechanisms people have at home (including charging speed and battery storage size)
    cost of electricity at each time interval, at each location

A. Optimizing for Multiple Objectives

According to various embodiments, reinforcement learning (RL) framework is used to optimize the control of power distribution for multiple objectives. A reinforcement learning system takes as input a set of observations. The observations include a set of feature values, a set of control values and a corresponding set of objective values. The feature/control/objective values are captured over a span of time during operation of the system. Any mechanism or combination of mechanisms may be used for capturing the observations. In the present example, the feature values may include (a) presence of a vehicle, (b) charge duration of each vehicle, (c) vehicle type of each vehicle charged by the system (e.g. the network of charging stations illustrated in FIG. 3) during each time interval. One of the control values may be the percentage of a charging station's power that is provided at each port in the system during each time interval. One of the objective values may be the number of vehicles serviced by the system per each time interval.

With respect to the objectives for which the reinforcement learning framework is optimized, in one embodiment each objective is represented by a single scalar value. For example, for the objective of maximizing the number of vehicles serviced by a charging station, the scalar value for the objective may be the number of serviced vehicles per day. As another example, for the objective of maximizing the total amount of power distributed, the amount of power distributed at each multi-port station in the system may be summed at fixed intervals (e.g. daily or hourly) to produce the scalar value that corresponds to the objective.

Over time, as additional observation data is fed into the reinforcement learning system, the reinforcement learning system learns from the real-world observations how to control the control parameters in such a way as to optimize for the objectives. For example, with sufficient information about electric vehicle traffic, the types of vehicles, their routes, their charging times, etc., the system may learn to control the distribution of power to each port in each charging station so as to achieve an optimal balance of (a) maximizing the number of vehicles serviced, (b) maximizing the daily power output, and (c) minimizing the use of peak-time power. Some of this information may be gathered from self-driving fleets or from vehicles with GPS tracking capabilities, which may include in-dash navigation systems or in-vehicle smart devices such as smartphones or tablets. This is merely one example of a set of objectives that for which a reinforcement learning framework may be trained. The techniques described herein are not limited to any particular set of objectives.

The example given above only involved the single control parameter of the percentage of a charging station's power that is provided to each port. However, in more complex embodiments, the machine learning engine may be used to control any number of control parameters. Examples of parameters that may be controlled by the machine learning system, instead of or in addition to the percentage of power provided to each port, include:

- parameters that influence driver behavior, such as pricing (which may dynamically be changed over time on a per-station basis)
- selection of energy source for charging (e.g. charging-station-operated batteries or the grid)

V. Implementation Processes

Figure 4:
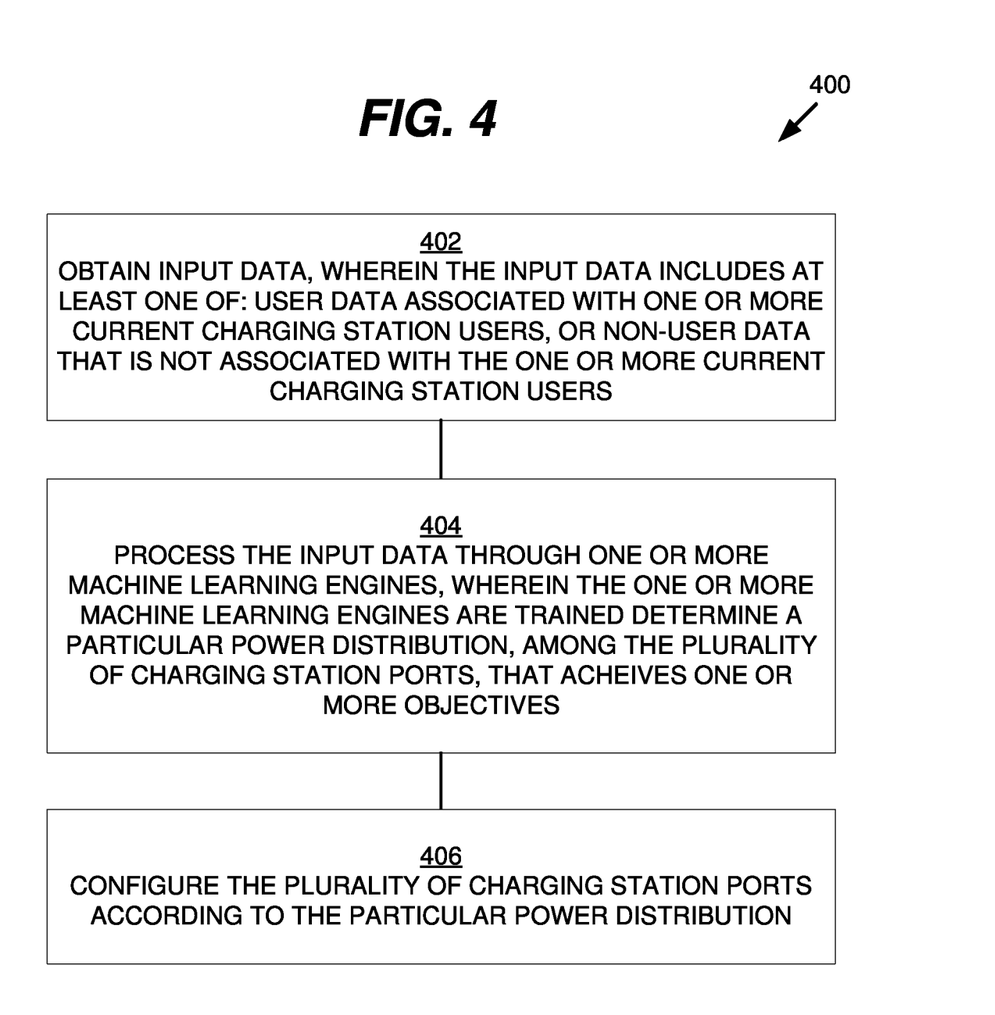
FIG. 4 is a flow diagram that depicts an approach for dynamically controlling an automated distribution of power amongst a plurality of charging station ports.

FIG. 4 is a flow diagram 400 that depicts an approach for dynamically controlling power distribution amongst a plurality of charging station ports.

Figure 1:
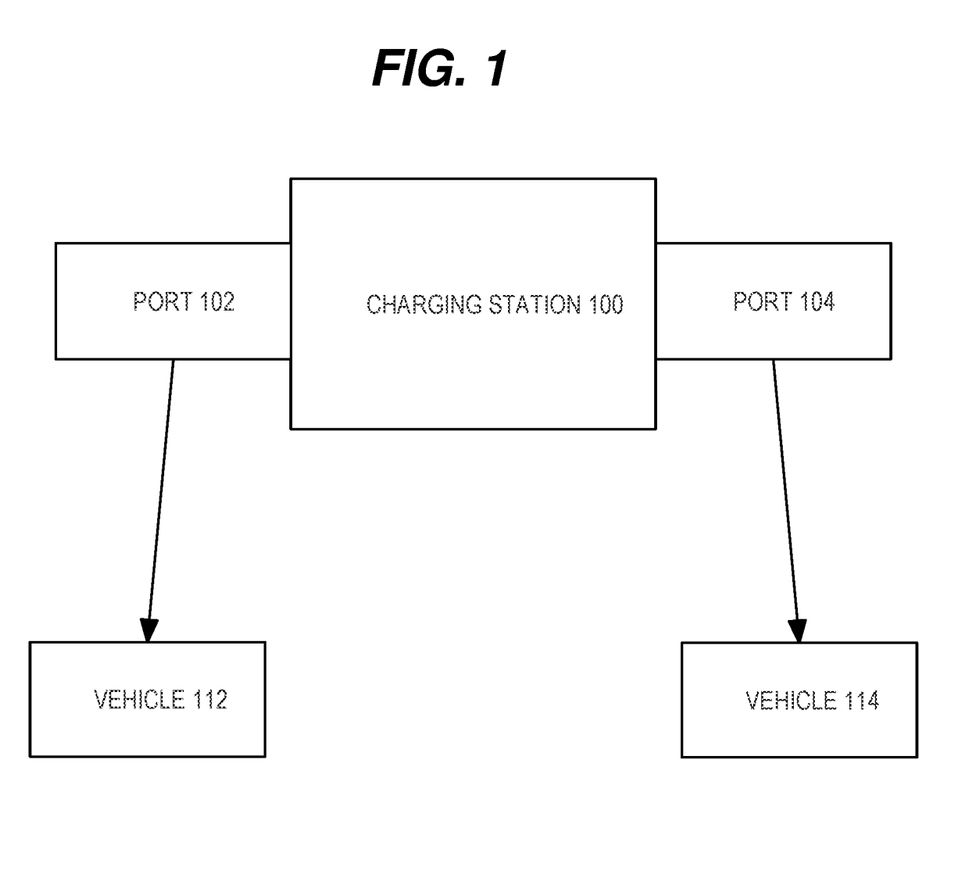
FIG. 1 is a block diagram of a 2-port charging station.

In block 402, referring to FIG. 1, charging station 100 obtains input data, wherein the input data includes at least one of: user data associated with one or more current charging station users, such as users of charging station 100, or non-user data that is not associated with the one or more current charging station users. For example, the current charging station users may correspond to a first user of vehicle 112 and a second user of vehicle 114. While the example here includes two charging station users, other implementations may support a single user or more than two users. As described above in Section III, various methods may be used to obtain the user data, such as receiving real-time inputs from input devices at charging station 100, or by retrieving user account or user profile data from associated identifying information received from a card reader, sensor, mobile application API, vehicle wireless transmission, or other method.

Non-user data that is not associated with the current charging station users may be obtained in block 402. The non-user data may pertain to data that is not specifically associated with a charging user, such as data concerning the charging station itself, data concerning an owner or an associated business of the charging station, data concerning an energy source for the charging station such as an on-site battery or wall AC power, data concerning an electric utility providing power to the charging station, or data concerning other third parties and stakeholders.

In block 404, referring to FIG. 1, charging station 100 processes the input data from block 402 through one or more machine learning engines, wherein the one or more machine learning engines are trained to determine a particular power distribution, amongst ports 102 and 104, that achieves one or more objectives. In various implementations, (1) only user data, (2) only non-user data, or (3) both user data and non-user data may be processed through the one or more machine learning engines. As described above in Section I, various objectives can be pursued, such as maximizing the number of vehicles served at charging station 100, amongst other objectives. Further, as discussed above in Section IV, the objectives may optionally include system-wide objectives that are applicable to multiple charging stations that may be distributed over a geographic region. As discussed above in Section II, one or more features may be used to train the one or more machine learning engines. Further, as discussed above in Section IV(A), the one or more machine learning engines may utilize a reinforcement learning framework to refine the engines over time from observational input data.

In block 406, referring to FIG. 1, charging station 100 configures ports 102 and 104 according to the particular power distribution from block 404. The particular power distribution may specify a maximum charging rate, or a percentage of a power budget, for each of the ports 102 and 104. For example, assuming a power budget of 100 watts for charging station 100, one example power distribution may allocate 30 watts (30%) to port 102, and 70 watts (70%) to port 104. The power budgets may be individual for each charging station and/or aggregate for multiple charging stations. Charging station 100 may then configure ports 102 and 104 to charge respective vehicles 112 and 114 at up to the specified maximum charging rates of 30 watts and 70 watts, respectively. While the above described example configures the ports of (1) a single multi-port charging station with an individual charging station power budget, other implementations may configure the ports of (2) multiple single-port charging stations having one or more aggregate power budgets, or (3) multiple charging stations having any mix of single or multiple charging ports with individual and/or aggregate power budgets.

In some implementations, only a subset of the plurality of charging station ports may be in current use for charging user vehicles. For example, referring to FIG. 1, vehicle 114 may be disconnected from port 104, with only vehicle 112 connected to port 102. In this case, the one or more machine learning engines may generate a power distribution that allocates power substantially to ports that are currently in use, or port 102. Thus, an example power distribution may allocate 80 watts (80%) to port 102, and 20 watts (20%) to port 104. Since port 104 is not actively charging a vehicle, the unused charging capacity, or 20 watts, may be redirected towards other uses, such as recharging an on-site battery, or may be held as a buffer to reduce total power consumption. Accordingly, the one or more machine learning engines may also be trained to reserve a portion of unused power to accommodate other tasks besides vehicle charging. When a configuration of connected ports is later changed, for example when vehicle 114 is later connected to port 104, then the power distribution may be reconfigured by repeating blocks 402-406 of flow diagram 400 to dynamically adjust to changing charging conditions.

In some implementations, a power distribution may not consume an entire power budget or 100% of available power allocated to the plurality of charging station ports. For example, during peak load times when energy costs are high, it may be advantageous to limit total power consumption to reduce operating costs. Thus, an example power distribution for peak usage hours may allocate 80% of available power to charging station ports, with 20% (20 watts) to port 102 and 60% (60 watts) to port 104, leaving 20% (20 watts) as unused capacity to reduce total power draw. The allocation may be adjusted by, for example, adjusting a weighting of the feature "current cost of energy" when training the one or more machine learning engines.

VI. Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 5:
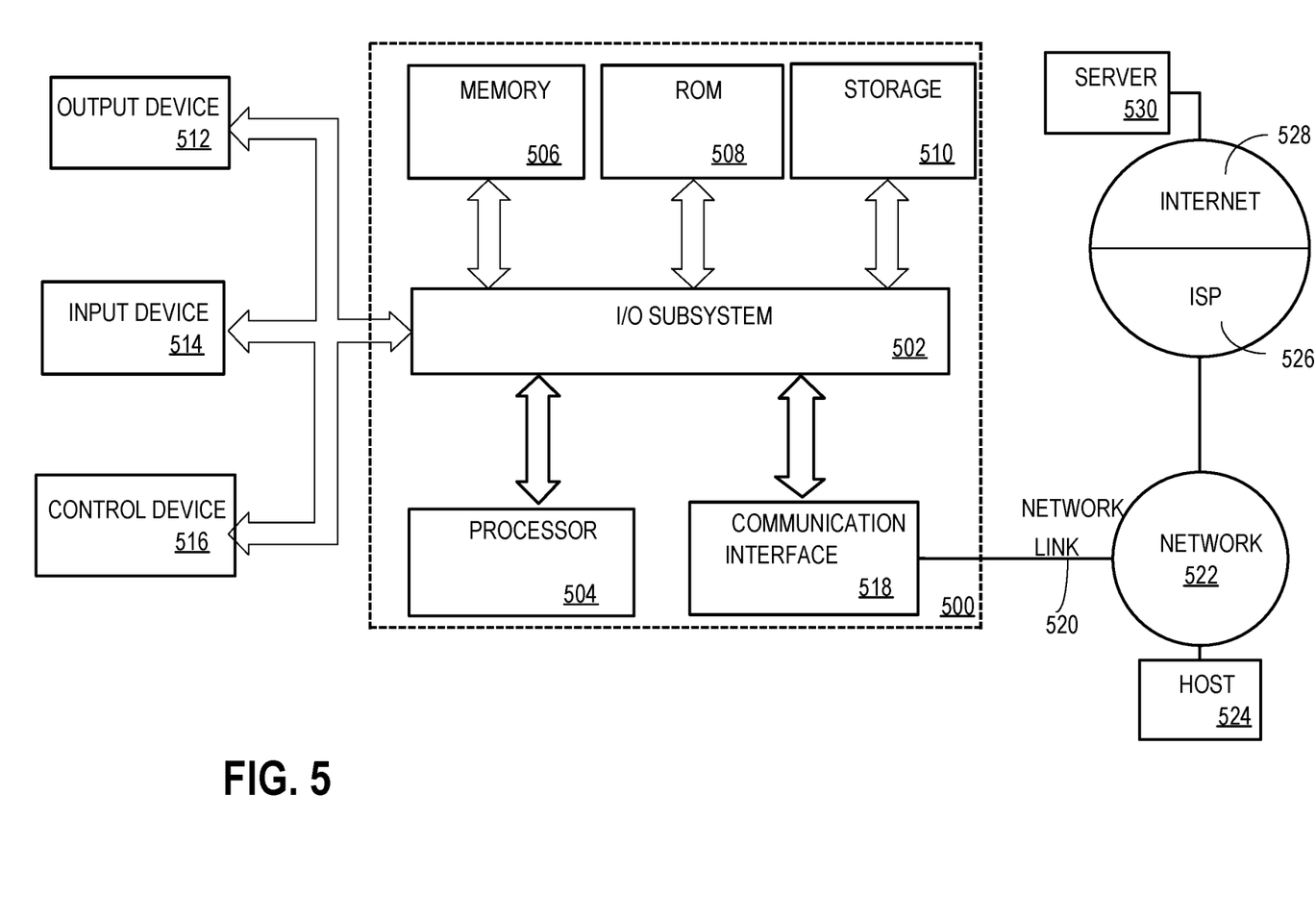
FIG. 5 is a block diagram of a computer system that may be used to implement the automated power distribution techniques described herein.

For example, FIG. 5 is a block diagram that illustrates a computer system 500 upon which an embodiment of the invention may be implemented. Computer system 500 includes a bus 502 or other communication mechanism for communicating information, and a hardware processor 504 coupled with bus 502 for processing information. Hardware processor 504 may be, for example, a general purpose microprocessor.

Computer system 500 also includes a main memory 506, such as a random access memory (RAM) or other dynamic storage device, coupled to bus 502 for storing information and instructions to be executed by processor 504. Main memory 506 also may be used for storing temporary variables or other intermediate information during execution of instructions to be executed by processor 504. Such instructions, when stored in non-transitory storage media accessible to processor 504, render computer system 500 into a special-purpose machine that is customized to perform the operations specified in the instructions.

Computer system 500 further includes a read only memory (ROM) 508 or other static storage device coupled to bus 502 for storing static information and instructions for processor 504. A storage device 510, such as a magnetic disk, optical disk, or solid-state drive is provided and coupled to bus 502 for storing information and instructions.

Computer system 500 may be coupled via bus 502 to a display 512, such as a cathode ray tube (CRT), for displaying information to a computer user. An input device 514, including alphanumeric and other keys, is coupled to bus 502 for communicating information and command selections to processor 504. Another type of user input device is cursor control 516, such as a mouse, a trackball, or cursor direction keys for communicating direction information and command selections to processor 504 and for controlling cursor movement on display 512. This input device typically has two degrees of freedom in two axes, a first axis (e.g., x) and a second axis (e.g., y), that allows the device to specify positions in a plane.

Computer system 500 may implement the techniques described herein using customized hard-wired logic, one or more ASICs or FPGAs, firmware and/or program logic which in combination with the computer system causes or programs computer system 500 to be a special-purpose machine. According to one embodiment, the techniques herein are performed by computer system 500 in response to processor 504 executing one or more sequences of one or more instructions contained in main memory 506. Such instructions may be read into main memory 506 from another storage medium, such as storage device 510. Execution of the sequences of instructions contained in main memory 506 causes processor 504 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage device 510. Volatile media includes dynamic memory, such as main memory 506. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 502. Transmission media can also take the form of acoustic or light waves, such as those generated during radio-wave and infra-red data communications.

Various forms of media may be involved in carrying one or more sequences of one or more instructions to processor 504 for execution. For example, the instructions may initially be carried on a magnetic disk or solid-state drive of a remote computer. The remote computer can load the instructions into its dynamic memory and send the instructions over a telephone line using a modem. A modem local to computer system 500 can receive the data on the telephone line and use an infra-red transmitter to convert the data to an infra-red signal. An infra-red detector can receive the data carried in the infra-red signal and appropriate circuitry can place the data on bus 502. Bus 502 carries the data to main memory 506, from which processor 504 retrieves and executes the instructions. The instructions received by main memory 506 may optionally be stored on storage device 510 either before or after execution by processor 504.

Computer system 500 also includes a communication interface 518 coupled to bus 502. Communication interface 518 provides a two-way data communication coupling to a network link 520 that is connected to a local network 522. For example, communication interface 518 may be an integrated services digital network (ISDN) card, cable modem, satellite modem, or a modem to provide a data communication connection to a corresponding type of telephone line. As another example, communication interface 518 may be a local area network (LAN) card to provide a data communication connection to a compatible LAN. Wireless links may also be implemented. In any such implementation, communication interface 518 sends and receives electrical, electromagnetic or optical signals that carry digital data streams representing various types of information.

Network link 520 typically provides data communication through one or more networks to other data devices. For example, network link 520 may provide a connection through local network 522 to a host computer 524 or to data equipment operated by an Internet Service Provider (ISP) 526. ISP 526 in turn provides data communication services through the world wide packet data communication network now commonly referred to as the "Internet" 528. Local network 522 and Internet 528 both use electrical, electromagnetic or optical signals that carry digital data streams. The signals through the various networks and the signals on network link 520 and through communication interface 518, which carry the digital data to and from computer system 500, are example forms of transmission media.

Computer system 500 can send messages and receive data, including program code, through the network(s), network link 520 and communication interface 518. In the Internet example, a server 530 might transmit a requested code for an application program through Internet 528, ISP 526, local network 522 and communication interface 518.

The received code may be executed by processor 504 as it is received, and/or stored in storage device 510, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

The invention claimed is:

1. A method for dynamically controlling distribution of power amongst a plurality of charging station ports that includes a particular port, comprising:
obtaining input data that includes a sequence of time intervals and a charging ramp-up time of a vehicle that is connected to the particular port in a particular time interval of the sequence of time intervals;
training, by reinforcement learning that is based on the input data, one or more machine learning engines to determine a particular power distribution, among the plurality of charging station ports, wherein the reinforcement learning comprises determining a scalar number for each objective in a plurality of objectives that include:
maximizing a number of vehicles serviced in the particular time interval,
maximizing a daily power output, and
minimizing a use of peak-time power; and
configuring the plurality of charging station ports according to the particular power distribution to:
decrease the power allocated to the particular port during a peak time and
increase the power to the particular port during a non-peak time;
wherein the method is performed by one or more computers.

2. The method of claim 1 wherein the plurality of charging station ports includes
at least one charging station port on a single-port charging station.

3. The method of claim 1 wherein the plurality of charging station ports includes
at least multiple charging station ports located on a single multi-port charging station.

4. The method of claim 1, wherein the input data includes non-user data that comprises at least one of:
data concerning an owner or an associated business of the one or more charging stations; or
data concerning a third party.

5. The method of claim 1, wherein at least some of the input data corresponds to one or more features, and wherein the one or more machine learning engines are trained based on data corresponding to the one or more features, wherein the one or more features include at least one of:
a current state of a vehicle battery to be charged;
information regarding a user's current trip;
a current time of day;
a current cost of energy;
an energy source for charging; or
individual charger capacity for each of one or more charging stations associated with the plurality of charging station ports.

6. The method of claim 1, wherein the input data comprises at least one of:
real-time data from one or more input devices located at one or more charging stations associated with the plurality of charging station ports;
user identifying information from a card reader, a mobile device display, or a wireless signal;
current trip information received from a mobile device using an application program interface (API);
user or vehicle identifying information from image recognition using one or more sensors at the one or more charging stations, or by receiving wireless radio signals transmitted by a vehicle; or
outputs from other machine learning engines.

7. The method of claim 1, wherein the particular power distribution specifies a maximum charging rate for each of the plurality of charging station ports, or a percentage of a power budget for each of the plurality of charging station ports.

8. The method of claim 1, wherein the plurality of objectives comprise at least one of:
maximizing a revenue of one or more charging stations associated with the plurality of charging station ports; or
ensuring vehicles are charged sufficiently to reach a next charging station in a current route.

9. The method of claim 1, wherein the one or more machine learning engines are trained based on data corresponding to one or more features, and wherein the one or more features include at least one of:
locations of a plurality of charging stations, associated with the plurality of charging station ports, where charging power is at least partially from solar panels;
locations of a plurality of charging stations, associated with the plurality of charging station ports, where charging power is at least partially from local battery storage;
types of home charging mechanisms associated with one or more current charging station users, including charging speed and battery storage size; or
cost of electricity at each time interval, at each of a plurality of charging stations associated with the plurality of charging station ports.

10. The method of claim 1, wherein the reinforcement learning (RL) comprises obtaining observation inputs at recurring time intervals, wherein the observation inputs include
control values including a percentage of power directed to each of the plurality of charging station ports.

11. The method of claim 1, further comprising processing, from the input data, at least one of user data or non-user data through the one or more machine learning engines to further generate and configure at least one of:
parameters of one or more charging stations associated with the plurality of charging station ports, including pricing, for influencing driver behavior; or
an energy source selection for the one or more charging stations.

12. One or more computing devices configured to dynamically control distribution of power amongst a plurality of charging station ports that includes a particular port, by:
obtaining input data that includes a sequence of time intervals and a charging ramp-up time of a vehicle that is connected to the particular port in a particular time interval of the sequence of time intervals;
training, by reinforcement learning that is based on the input data, one or more machine learning engines to determine a particular power distribution, among the plurality of charging station ports, wherein the reinforcement learning comprises determining a scalar number for each objective in a plurality of objectives that include:
maximizing a number of vehicles serviced in the particular time interval,
maximizing a daily power output, and
minimizing a use of peak-time power; and
configuring the plurality of charging station ports according to the particular power distribution to:
decrease the power allocated to the particular port during a peak time and
increase the power to the particular port during a non-peak time.

13. A non-transitory computer readable medium comprising instructions executable by a processor to dynamically control distribution of power amongst a plurality of charging station ports that includes a particular port, the instructions comprising instructions for:
obtaining input data that includes a sequence of time intervals and a charging ramp-up time of a vehicle that is connected to the particular port in a particular time interval of the sequence of time intervals;
training, by reinforcement learning that is based on the input data, one or more machine learning engines to determine a particular power distribution, among the plurality of charging station ports, wherein the reinforcement learning comprises determining a scalar number for each objective in a plurality of objectives that include:
maximizing a number of vehicles serviced in the particular time interval,
maximizing a daily power output, and
minimizing a use of peak-time power; and
configuring the plurality of charging station ports according to the particular power distribution to:
decrease the power allocated to the particular port during a peak time and
increase the power to the particular port during a non-peak time.

14. The non-transitory computer-readable media of claim 13 wherein the plurality of charging station ports includes at least one charging station port on a single-port charging station.

15. The non-transitory computer-readable media of claim 13 wherein the plurality of charging station ports includes at least multiple charging station ports located on a single multi-port charging station.

16. The non-transitory computer-readable media of claim 13, wherein the input data includes non-user data, and the non-user data that comprises at least one of:
data concerning an owner or an associated business of the one or more charging stations; or
data concerning a third party.

17. The non-transitory computer-readable media of claim 13, wherein
at least some of the input data corresponds to one or more features, and wherein the one or more machine learning engines are trained based on data corresponding to the one or more features, wherein the one or more features include at least one of:
a current state of a vehicle battery to be charged;
information regarding a user's current trip;
a current time of day;
a current cost of energy;
an energy source for charging; or
individual charger capacity for each of one or more charging stations associated with the plurality of charging station ports.

18. The non-transitory computer-readable media of claim 13, wherein the input data comprises at least one of:
real-time data from one or more input devices located at one or more charging stations associated with the plurality of charging station ports;
user identifying information from a card reader, a mobile device display, or a wireless signal;
current trip information received from a mobile device using an application program interface (API);
user or vehicle identifying information from image recognition using one or more sensors at the one or more charging stations, or by receiving wireless radio signals transmitted by a vehicle; or outputs from other machine learning engines.

19. The non-transitory computer-readable media of claim 13, wherein the particular power distribution specifies a maximum charging rate for each of the plurality of charging station ports, or a percentage of a power budget for each of the plurality of charging station ports.

20. The non-transitory computer-readable media of claim 13, wherein the plurality of objectives comprise at least one of:
   maximizing a revenue of one or more charging stations associated with the plurality of charging station ports; or
   ensuring vehicles are charged sufficiently to reach a next charging station in a current route.

21. The non-transitory computer-readable media of claim 13, wherein the one or more machine learning engines are trained based on data corresponding to one or more features, and wherein the one or more features include at least one of:
   locations of a plurality of charging stations, associated with the plurality of charging station ports, where charging power is at least partially from solar panels;
   locations of a plurality of charging stations, associated with the plurality of charging station ports, where charging power is at least partially from local battery storage;
   types of home charging mechanisms associated with one or more current charging station users, including charging speed and battery storage size; or
   cost of electricity at each time interval, at each of a plurality of charging stations associated with the plurality of charging station ports.

22. The non-transitory computer-readable media of claim 13, wherein the reinforcement learning (RL) comprises obtaining observation inputs at recurring time intervals, wherein the observation inputs include:
   control values including a percentage of power directed to each of the plurality of charging station ports.

23. The non-transitory computer-readable media of claim 13, wherein the instructions are configured to process, from the input data, at least one of user data or non-user data through the one or more machine learning engines to further generate and configure at least one of:
   parameters of one or more charging stations associated with the plurality of charging station ports, including pricing, for influencing driver behavior; or
   an energy source selection for the one or more charging stations.

* * * * *